United States Patent
Rajagopal et al.

(10) Patent No.: US 8,950,933 B2
(45) Date of Patent: Feb. 10, 2015

(54) APPARATUS AND METHOD FOR CHANNEL AGGREGATION AND GUARD CHANNEL INDICATION FOR VISIBLE LIGHT COMMUNICATION

(75) Inventors: Sridhar Rajagopal, Plano, TX (US); Farooq Khan, Allen, TX (US); Ying Li, Garland, TX (US); Jaeseung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 12/895,225

(22) Filed: Sep. 30, 2010

(65) Prior Publication Data

US 2011/0091220 A1    Apr. 21, 2011

Related U.S. Application Data

(60) Provisional application No. 61/279,052, filed on Oct. 15, 2009.

(51) Int. Cl.
   *H04B 10/00* (2013.01)
   *H04B 10/116* (2013.01)
   *H04B 10/114* (2013.01)

(52) U.S. Cl.
   CPC .......... *H04B 10/116* (2013.01); *H04B 10/1149* (2013.01)
   USPC ........... 368/127; 398/118; 398/119; 398/128; 398/130

(58) Field of Classification Search
   None
   See application file for complete search history.

(56) References Cited

U.S. PATENT DOCUMENTS

| | | | | |
|---|---|---|---|---|
| 2003/0046293 A1* | 3/2003 | Harris et al. | .................. | 707/100 |
| 2003/0119484 A1* | 6/2003 | Adachi et al. | ................ | 455/411 |
| 2004/0264475 A1* | 12/2004 | Kowalski | ................... | 370/395.5 |
| 2006/0050754 A1* | 3/2006 | Morris et al. | .............. | 372/50.12 |
| 2007/0081489 A1* | 4/2007 | Anderson et al. | ............ | 370/329 |
| 2007/0291639 A1* | 12/2007 | Jacobsen et al. | ............. | 370/208 |
| 2008/0081642 A1 | 4/2008 | Xu et al. | | |
| 2008/0253766 A1* | 10/2008 | Yu et al. | ......................... | 398/41 |

(Continued)

FOREIGN PATENT DOCUMENTS

| | | |
|---|---|---|
| EP | 1 993 286 A1 | 11/2008 |
| JP | 2004297425 A | 10/2004 |

(Continued)

OTHER PUBLICATIONS

International Search Report dated May 25, 2011 in connection with International Patent Application No. PCT/KR2010/007098.

(Continued)

*Primary Examiner* — Darren E Wolf

(57) ABSTRACT

A method, apparatus, and a non-transitory computer readable storage medium for supporting visible light communication (VLC) exchanges bitmaps for capabilities field exchange in a media access control (MAC) layer during link establishment and association with other VLC-enabled devices. An aggregation bitmap is generated to indicate whether a visible light communication (VLC) transmitter of a first device uses at least one aggregated band that comprises multiple active frequency bands. The aggregation bitmap is transmitted in a capabilities information exchange (CIE) signal to a second device. A guard bitmap that identifies a set of guard frequency bands is also generated and transmitted in the CIE signal. Each guard frequency band indicates leakage transmission from the VLC transmitter.

20 Claims, 9 Drawing Sheets

AGGREGATION BITMAP
610

| 0 | 1 | 2 | 3 | 4 | 5 | 6 |
|---|---|---|---|---|---|---|
| 0 | 1 | 1 | 0 | 0 | 0 | 0 |

| 0 | 1 | 2 | 3 | 4 | 5 | 6 |
|---|---|---|---|---|---|---|
| 0 | 0 | 0 | 0 | 0 | 0 | 0 |

615
GUARD BITMAP

(56) References Cited

U.S. PATENT DOCUMENTS

2009/0202245 A1* 8/2009 Bouda .......................... 398/76
2010/0034540 A1   2/2010 Togashi
2012/0301155 A1  11/2012 Irie

FOREIGN PATENT DOCUMENTS

| JP | 2006094014 A | 4/2006 |
|---|---|---|
| JP | 2006217492 A | 8/2006 |
| JP | 2008252570 A | 10/2008 |
| KR | 1020050082968 A | 8/2005 |
| WO | WO 2010/095894 A2 | 8/2010 |

OTHER PUBLICATIONS

Joachim W. Walewski, et al., "Color stabilization for CSK by use of visibility frames", IEEE P802.15 Wireless Personal Area Networks, May 17, 2010, p. 1-9.
Translated Examination Report dated Jun. 4, 2013 in connection with Japanese Patent Application No. JP 2012-533097; 3 pages.

* cited by examiner

| FREQUENCY BAND | FREQUENCY BAND RANGE (NM) | | SPECTRAL WIDTH (NM) | COLOR | PROPOSED CODE |
|---|---|---|---|---|---|
| 0 | 380 | 450 | 70 | PB | 000 |
| 1 | 450 | 510 | 60 | B, BG | 001 |
| 2 | 510 | 560 | 50 | G | 010 |
| 3 | 560 | 600 | 40 | YG, GY, Y, YO, O | 011 |
| 4 | 600 | 650 | 50 | RO | 100 |
| 5 | 650 | 710 | 60 | R | 101 |
| 6 | 710 | 780 | 70 | R | 110 |
|   |     |     |    | RESERVED | 111 |

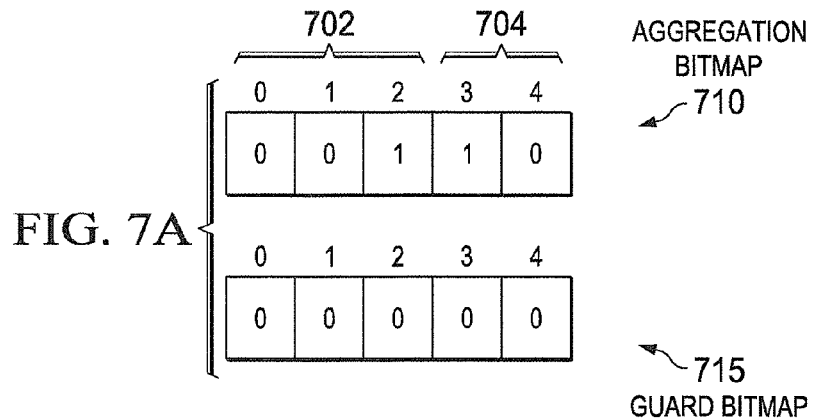
FIG. 7A
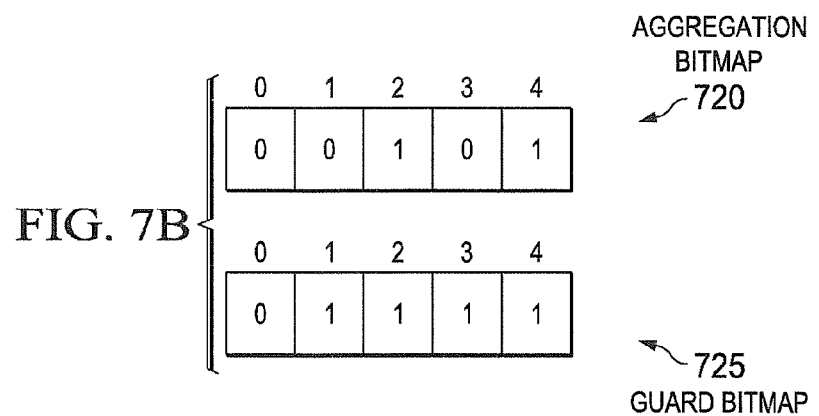
FIG. 7B
| BIT 0 | BIT 1 | USAGE |
|---|---|---|
| 0 | 0 | BAND NOT USED |
| 0 | 1 | BAND USED AS GUARD BAND |
| 1 | 0 | BAND USED BUT NOT AGGREGATED |
| 1 | 1 | BAND USED BUT AGGREGATED WITH PREVIOUS OR NEXT BAND |
FIG. 8A

US 8,950,933 B2

APPARATUS AND METHOD FOR CHANNEL AGGREGATION AND GUARD CHANNEL INDICATION FOR VISIBLE LIGHT COMMUNICATION

CROSS-REFERENCE TO RELATED APPLICATION(S) AND CLAIM OF PRIORITY

The present application is related to U.S. Provisional Patent Application No. 61/279,052, filed Oct. 15, 2009, entitled "CHANNEL AGGREGATION FOR VISIBLE LIGHT COMMUNICATION". Provisional Patent Application No. 61/279,052 is assigned to the assignee of the present application and is hereby incorporated by reference into the present application as if fully set forth herein. The present application hereby claims priority under 35 U.S.C. §119(e) to U.S. Provisional Patent Application No. 61/279,052.

TECHNICAL FIELD OF THE INVENTION

The present application relates generally to visible light communication and, more specifically, to a mechanisms for channel aggregation using bitmaps.

BACKGROUND OF THE INVENTION

Visible light communication (VLC) is a new technology for short-range optical wireless communication using visible light in optically transparent media. This technology provides access to several hundred terahertz (THz) of unlicensed spectrum. VLC is immune to the problems of electromagnetic interference and non-interference associated with radio frequency (RF) systems. VLC provides an additional level of security by allowing a user to see the transmission of data across the communication channel. Another benefit of VLC is that it augments and complements existing services (such as illumination, display, indication, decoration, etc.) from existing visible-light infrastructures. A VLC network is any network of two or more devices that engage in VLC.

A barrier to widespread use of VLC is the lack of standardized light sources manufactured for the purpose of VLC. Currently, light sources that are used in VLC devices are ordinary light sources that are used for illumination or decorative purposes. That is, manufacturers select materials and colors based on aesthetics and manufacturing costs. Furthermore, there are no standard frequency bands defined for VLC.

Therefore, there is a need in the art for a bandplan that defines a set of frequency bands within the visible light spectrum and a scheme that accommodates light sources that span multiple frequency bands during VLC transmission.

SUMMARY OF THE INVENTION

A method for capabilities field exchange in a media access control (MAC) layer during link establishment and association of a visible light communication (VLC) device is provided. The method includes generating an aggregation bitmap that indicates whether a visible light communication (VLC) transmitter of a first device uses at least one aggregated band that comprises multiple active frequency bands. The aggregation bitmap is transmitted in a capabilities information exchange (CIE) signal to a second device.

A visible light communication (VLC) device is provided. The VLC device includes a transmitter configured to transmit VLC signals. A controller generates an aggregation bitmap that indicates whether the transmitter of a first device uses at least one aggregated band that comprises multiple active frequency bands and include the aggregation bitmap in a capabilities information exchange (CIE) signal to be transmitted to a second device.

A non-transitory storage medium comprising software instructions for use in a device that supports visible light communication (VLC) is provided. The software instructions when executed by a controller perform a method that includes generating an aggregation bitmap that indicates whether a visible light communication (VLC) transmitter of a first device uses at least one aggregated band that comprises multiple active frequency bands. The aggregation bitmap is transmitted in a capabilities information exchange (CIE) signal to a second device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A and 7B illustrate aggregation and guard bitmaps according to another embodiment of the present disclosure;

FIGS. 8A-8C illustrate merged aggregation and guard channel bitmaps according to an embodiment of the present disclosure;

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged visible light communication network.

Figure 1:
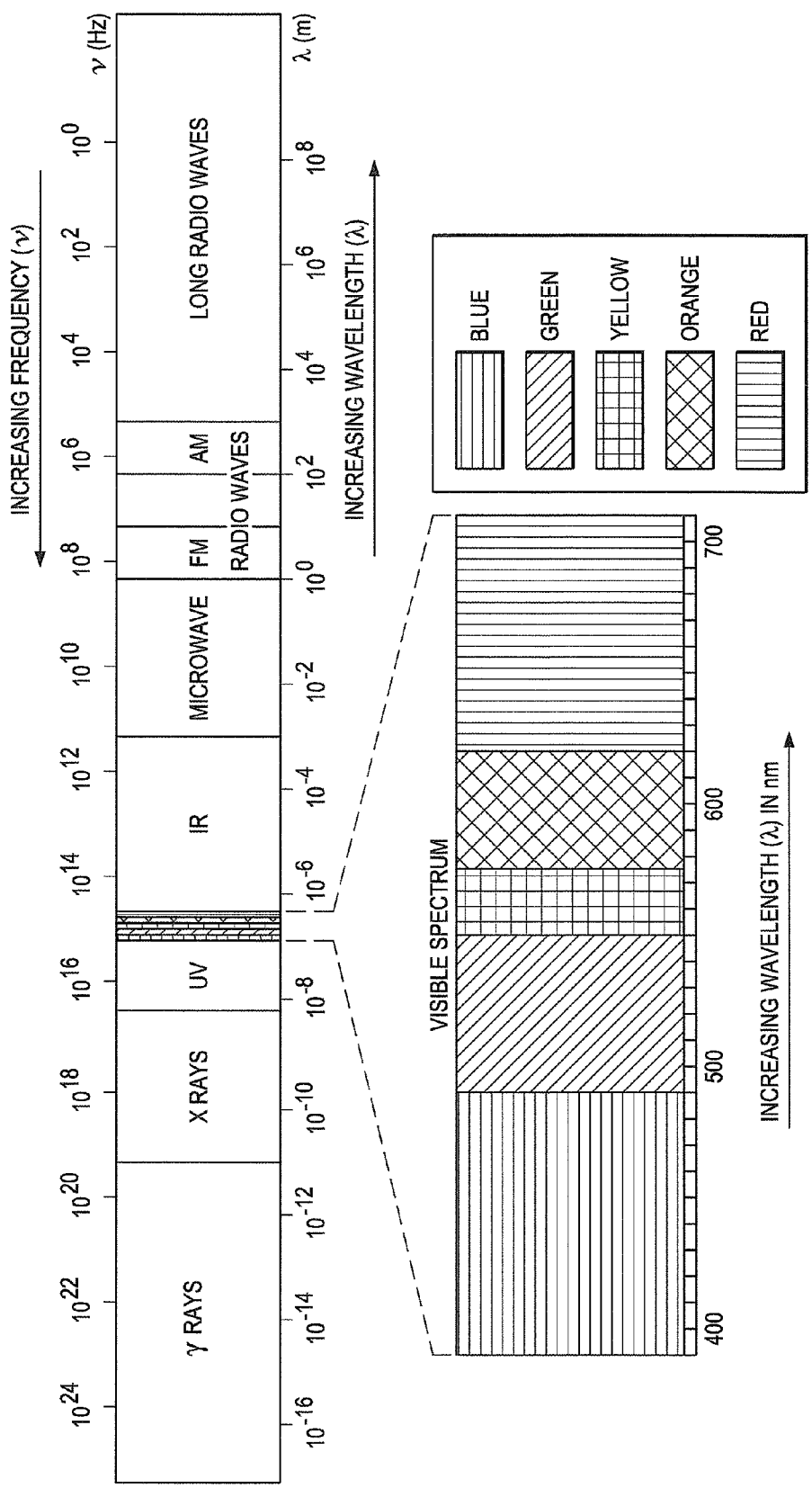
FIG. 1 illustrates the full electromagnetic frequency spectrum, and a breakout of the wavelengths occupied by visible light according to the principles of the present disclosure.

FIG. 1 illustrates the full electromagnetic frequency spectrum, and a breakout of the wavelengths occupied by visible light according to the principles of the present disclosure. Within the electromagnetic frequency spectrum lies the visible light spectrum which extends from 380 nm to 780 nm in wavelength. In essence this spectrum corresponds to a frequency range of approximately 400 to 790 THz. This relatively wide spectrum supports light sources with multiple colors, providing multiple channels for communication.

The blown up portion of the visible light spectrum is a rough mapping of wavelength range to a color of light. The transition between colors in the visible light spectrum is actually gradual.

Figure 2:
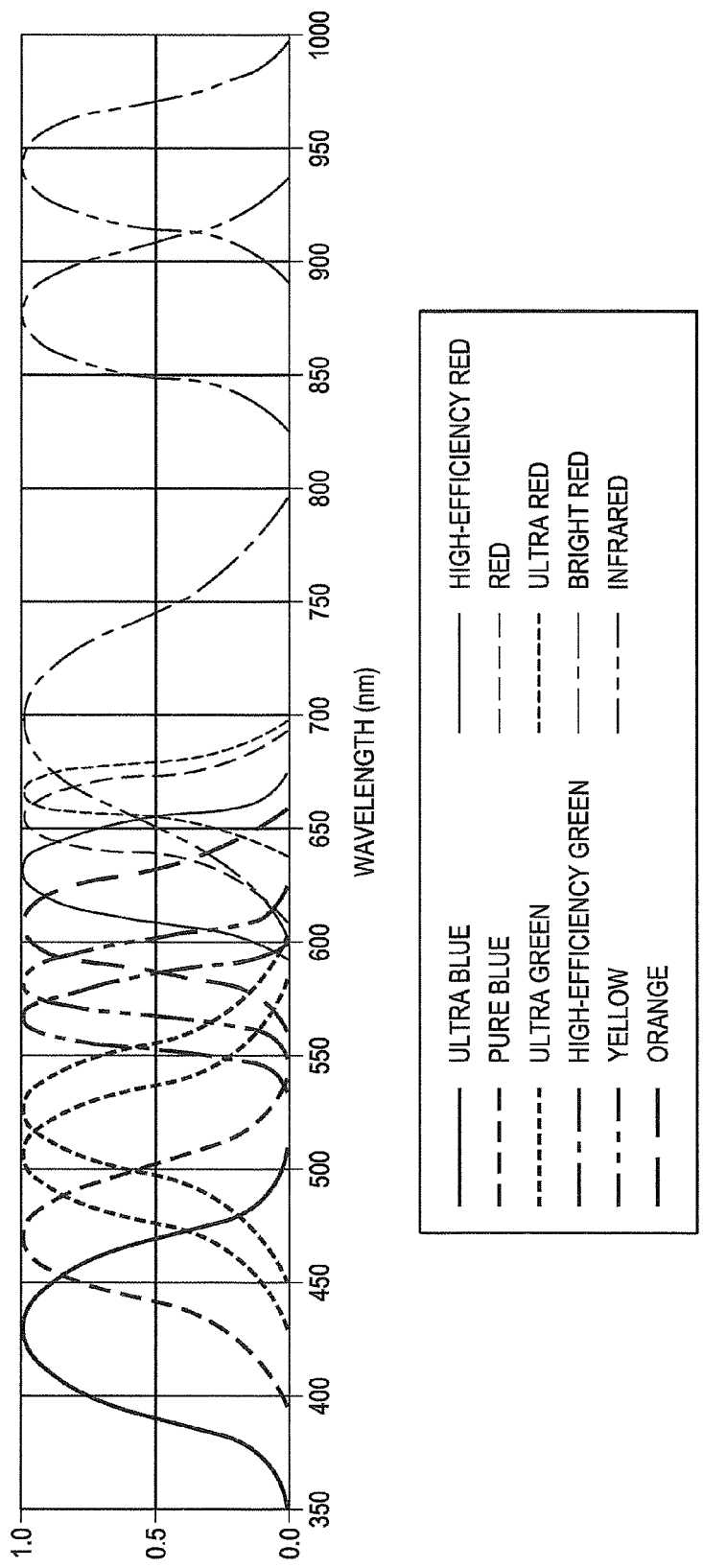
FIG. 2 illustrates an example of the variation in spectral width and wavelength for different types of light sources that could cause interference according to the principles of the present disclosure.

FIG. 2 illustrates an example of the variation in spectral width and wavelength for different types and colors of light sources, according to the principles of the present disclosure. The wavelength intervals are consistent with the wavelength intervals of FIG. 1. The spectral width and wavelength of each light source also depends on the property of the materials used in the manufacturing process. Any optical light source that emits visible light may be used as a VLC light source. A VLC light source may be, for example, any light emitting diode (LED), laser diode (LD), LED lamp, and solid state lamp.

Here, the color labels and the corresponding waveform are examples of colored light sources that are widely available. Specifically, the relative intensity by wavelength is shown for the following light sources: Ultra Blue, Pure Blue, two types of Ultra Green, High Efficiency Green, Yellow, Orange, High Efficiency Red, Red, Ultra Red, and Bright Red. One thing to note here is that there are two waves shown for Ultra Green. This reflects the possibility that two light sources having the same color may differ in spectral properties due to differences in materials and procedures used to manufacture the light sources. As can be seen in the illustration, depending on the choice of light sources, there is a possibility that the output of two light sources may interfere with each other due to the overlap in spectral width. For example, Pure Blue, which peaks at 470 nm (=640 THz) and has an approximate range of 400 nm to 540 nm (=555 THz-750 THz), would interfere with Ultra Green, which peaks at 555 nm (=540 THz) and has an approximate range of 430 nm to 575 nm (=520 THz-700 THz), due to significant overlap. In such cases, only one of the light sources can be used for transmission at a given time.

Figures 3, 4:
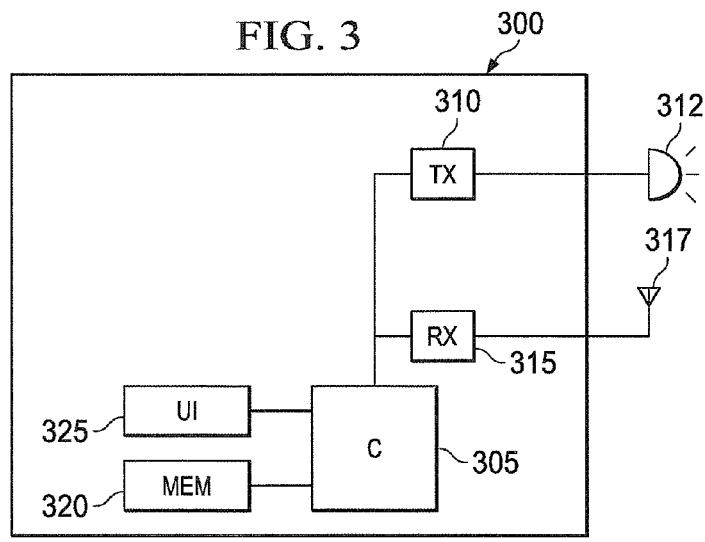
FIG. 3 illustrates a VLC device according to embodiments of the present disclosure.
FIG. 4 illustrates an example bandplan for visible light communication according to an embodiment of the present disclosure.

FIG. 3 illustrates a VLC device according to embodiments of the present disclosure. The VLC device 300 shown in FIG. 3 is for illustration only. Other embodiments could be used without departing from the scope of this disclosure.

The VLC device 300 can be any type of electronic device capable of transmitting and/or receiving colored visible light. For example and not limitation, the VLC device 300 can be a cellular phone, Personal Data Assistant (PDA), a smart phone, portable computer, a headset, a health monitor device, a sensor, an access point, a remote control, a personal storage device, a video display device, a remote beam-finder, a global positioning system device, an automobile, or a media device (such as a video recorder, MP3 player, or the like).

The VLC device 300 can include a controller 305. The controller 305 can be a microcontroller, processor, or processor array configured to control the operations of the VLC device 300. The controller may be configured to exchange capabilities information of the VLC device with other VLC devices during link establishment and association. In some embodiments, the controller 305 is configured to pair VLC device 300 with another VLC device.

The VLC device 300 may include at least one of a transmitter 310 and receiver 315 coupled to the controller 305. In some embodiments, the transmitter 310 and receiver 315 can be the main transmission/reception devices for VLC device 300 and couples to the controller 305 via an interface (not illustrated) that is adapted to enable the controller 305 to use the transmitter 310 and receiver 315 for capabilities field exchange in the MAC during link establishment and association with another VLC device. The transmitter 310 includes a transmit path (Tx) configured to transmit data signals and messages via one or more light sources 312. Although only one light source 312 is shown on VLC device 300, the transmitter 310 may be coupled to multiple light sources. The receiver 315 includes a receive path (Rx) configured to receive data signals and messages from via a light sensor 317. The light sensor is any component that is capable of detecting light such as, but not limited to, a photodiode (PD). In some embodiments, not specifically illustrated, the VLC device 300 includes a transmitter 310 and a receiver 315 as a single transceiver.

The VLC device 300 may also include a memory 320. According to some embodiments, controller 305 is operable to store information in the memory 320. Memory 320 can be any computer readable medium, for example, the memory 320 can be any electronic, magnetic, electromagnetic, optical, electro-optical, electro-mechanical, and/or other physical device that can contain, store, communicate, propagate, or transmit a computer program, software, firmware, or data for use by the controller 305 or other computer-related system or method. In some such embodiments, the controller 305 is configured to execute a plurality of instructions stored in a memory (not illustrated) configured to cause the controller 305 to perform a number of operations of the VLC device 300. In some embodiments, not specifically illustrated, the controller 305 may include a built-in memory.

In some embodiments, the VLC device 300 may include a User Interface (UI) 325. The UI 325 is coupled to the controller 305. The UI 325 is configured to receive one or more inputs from a user in order to direct a function of the VLC device 300. For example and not limitation, the UI 325 can be configured to place the VLC device 300 in a pair mode such that the VLC device 300 commences a search operation for link establishment and association with other VLC devices. In some embodiments, the UI 325 can be an Input/Output (I/O)

port adapted to couple to an external device, such as, for example, a personal computer, such that the user can use the external device to direct operations or store data, such as, for example, media data, in the VLC device 300. In some embodiments, not specifically illustrated, the UI 325 is optional.

In some embodiments, the controller 305 is preconfigured to cause the VLC device 300 to initiate link establishment and association with other VLC devices 300. The VLC device 300 can link with a second VLC device in response to a pairing signal received from the second VLC device. In some embodiments, the secondary device 111 is configured to actively search and pair with the VLC device 300.

Additionally, in some embodiments, the controller 305 may be configured to limit the VLC device 300 such that the VLC device 300 only links with one other VLC device at any given time. In some embodiments, the VLC device 300 can link with one other VLC device but detect presence of other VLC devices.

As with any communication transmission, knowledge of the frequency or frequency bands being used for transmission and reception is useful to attain interoperability and performance benefits. This is needed so that proper transmitters and receivers can interoperate and achieve good performance. Some examples of benefits are:

Interference handling: Indicating the desired frequency band can help receiver filter unwanted interference, if the receiver has multiple PDs and filters.

Channel selection: If a device supports multiple LEDs, one can optimize the link to choose the desired LED or set of LEDs for best performance and network capacity. This requires the knowledge of the frequency bands of the different light sources.

Filtering unwanted TX emissions at the RX: Some white LEDs are designed with blue LEDs and yellow phosphor. This yellow phosphor can reduce data rates due to inter-symbol interference. A blue filter can be used to increase data rates by filtering yellow phosphor. Knowledge of the blue LED and yellow phosphor at the receiver can help improve performance for receivers that have a blue filter.

Frequency-Division Duplexing (FDD) mode support: There can be self-interference between the LED and photodiode (PD) due to proximity. If a device is transmitting on a certain color in FDD mode (for example, visibility pattern during RX/idle mode to maintain visibility), it may not want to be receiving on the same color, if it can distinguish between multiple colors. Knowing what frequency bands are being used for transmission and what frequency bands are supported can influence the receiver in selecting a reverse link transmission.

In order to support such features, a bandplan, is proposed to divide the visible light spectrum into multiple communication channels. FIG. 4 illustrates an example bandplan 400 for visible light communication according to an embodiment of the present disclosure. The bandplan 400 provides support for seven logical channels in the MAC by a frequency band (i.e. frequency range) to each logical channel. As shown in the bandplan 400, seven frequency bands of varying spectral widths have been allocated. However, in order support association without knowledge of receiver capabilities and to support unidirectional broadcasting, VLC receivers may support reception on the entire visible light spectrum with any type of optical light source. The bandplan 400 is merely one example as a bandplan may have virtually any number of bands. The bandplan 400 is flexible and can be organized, as illustrated, according to common colors of light sources produced by manufacturers. In the context of visible light communication, each band may correspond to a logical channel in the MAC. Also, each band may be associated with a predetermined index value, as shown the in the Frequency Band column. In bandplan 400, the index values may be represented in three-digit binary code in the Proposed Code column and arranged in sequence from lowest to highest frequency. Bandplan 400 may be hard-wired in controller 305, transmitter 310, receiver 315, or stored in a memory of VLC device 300.

Because the spectral properties depend largely on the material, there are numerous types of light sources. In addition, manufacturers that produce lights, such as LEDs, usually do not consider their use in VLC communication, but rather are generally guided by aesthetics and material costs. As such, manufacturers can make light sources that span across multiple bands, creating an issue as to how the span across multiple bands can be indicated and how such light sources can be supported in VLC devices. Standards such as IEEE 802.11n provide the concept of "channel bonding," in which two communication channels are bonded to provide higher data rates. The present disclosure changes this concept to provide a flexible bandplan that utilizes aggregated bands to indicate light sources that span multiple bands.

Figure 5A:
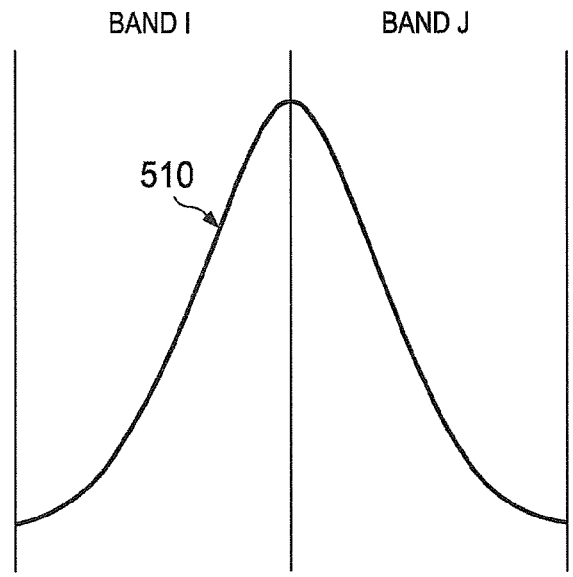
FIGS. 5A and 5B illustrate intentional and unintentional transmission according to an embodiment of the present disclosure.
Figure 5B:
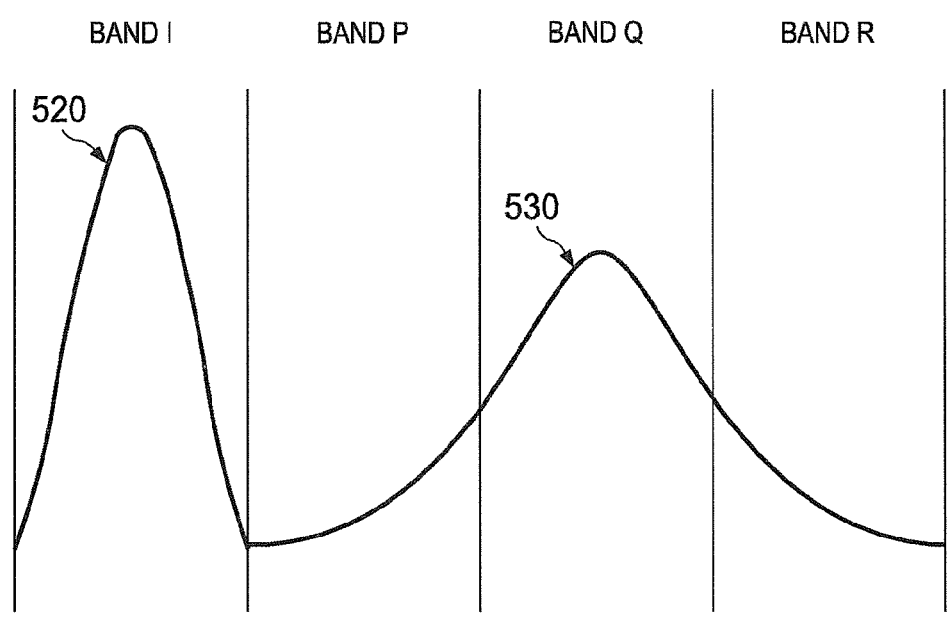

FIGS. 5A and 5B illustrate examples of intentional and unintentional transmission according to an embodiment of the present disclosure.

Channel aggregation is used to indicate optical sources that span multiple bands in the proposed bandplan and are intentionally transmitting on multiple bands due to the choice of optical light source. Guard channels are used to indicate optical sources that unintentionally leak into other bands, whose information can be discarded at the receiver for better performance.

In FIG. 5A, a light source transmits an intentional transmission 510 over two adjacent, non-overlapping frequency bands, Band i and Band j. That is, the color of the light emitted by the light source spans Band i and Band j. This is an example of an aggregated band as both bands are used to transmit the intentional transmission 510. In this case, the transmitter and the receiver can communicate over a channel comprising an aggregated band that merges Band i and Band j to accommodate signal 510 produced by the light source. However, this is merely one example, as an aggregated band may comprise more than two bands, to accommodate a light source.

In FIG. 5B, a light source causes both an intentional transmission 520 over Band i and an unintentional transmission 530 that spans across Bands p, q, and r. The unintentional transmission 530 occurs when a light source leaks into other bands. Leakage transmission may cause interference during visible light communication. For example, a white LED having a bluish tint may actually be a blue LED with yellow phosphor. The blue LED is the intentional transmitter that transmits over Band i, and the yellow phosphor is the unintentional transmitter that causes leakage that spans Bands p, q, and r. The blue LED has a higher frequency response time than yellow phosphor, so filtering out Bands p, q, and r (i.e. unintentional transmission 530) at the receiver when transmitting from the blue LED light source would be desirable to reduce interference and achieve a higher data rate.

The objective is to allow VLC device 300 to establish communication channels using virtually any available light source. These concepts are provided in the information capabilities in the media access control (MAC) level and do not impact the physical (PHY) layer or the illumination.

Each of the embodiments of the present disclosure employs a bandplan in which each band is indexed as '0', '1', '2', ... M−1, from low frequency to high frequency, where M is equivalent to the total number of bands in the bandplan.

According to embodiments of the present disclosure, a bitmap is used to indicate channel aggregation. The same bitmap format may be used for indicating guard channels that indicate leakage transmission from light source 312. The bitmaps are sent from transmitter 310 of VLC device 300 as part of the capabilities field exchange in the MAC during link establishment and association with another VLC device for bi-directional communication or unidirectional broadcasting (IB/VB). In this case, when associating with a new device, a transmitting VLC device sends one or more bitmaps to a receiver of another VLC device to communicate its transmission capabilities, i.e. the number of light sources, what frequency bands are active, whether any frequency bands are aggregated, and whether there is any leakage transmission.

If multiple bands are aggregated or multiple optical sources are transmitting simultaneously, the same data shall be sent on all optical sources during the preamble and header during device discovery because the receiver's capabilities are not known. The details on channel aggregation and guard channel support are provided in the PHY capabilities information element of the MAC. In an embodiment, the criterion used for defining a guard color channel or aggregated channel is based on out-of-band leakage, such as exceeding 20 dB over maximum in-channel value. The transmitting device shall indicate channel aggregation and guard channel support using the PHY capabilities during device discovery and association for bi-directional communication modes.

Figure 6A:
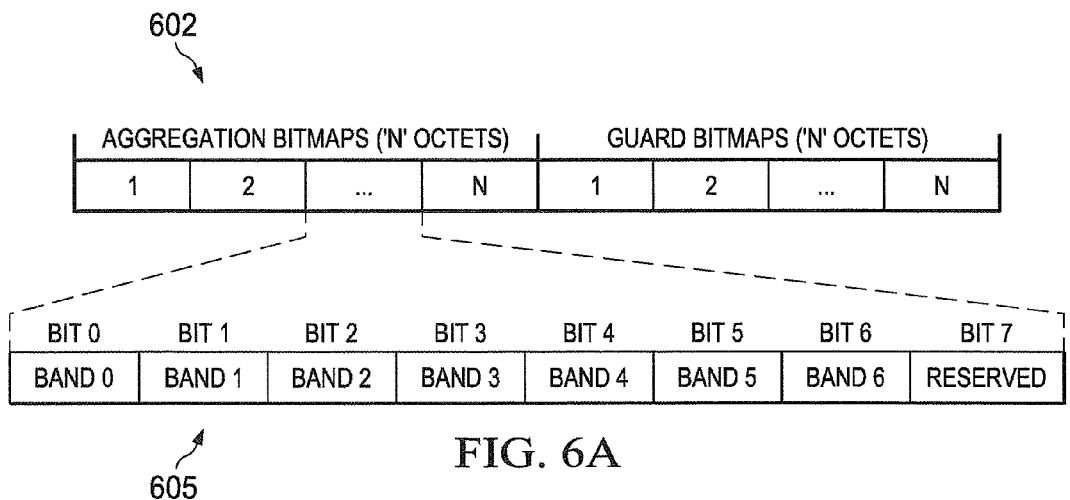
FIGS. 6A, 6B, and 6C illustrate aggregation and guard bitmaps according to an embodiment of the present disclosure.
Figure 6B:
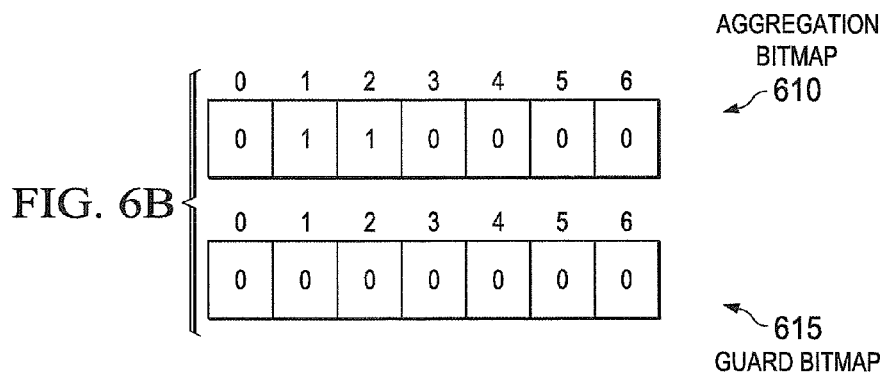
Figure 6C:
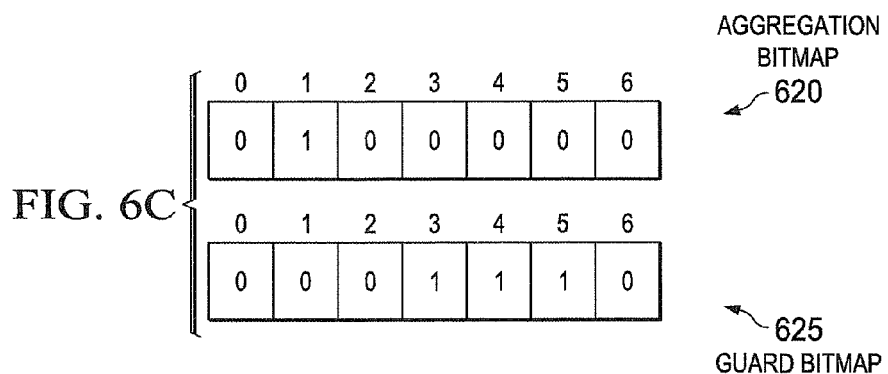

FIGS. 6A, 6B, and 6C illustrate aggregation and guard bitmaps according to an embodiment of the present disclosure. In FIG. 6A, the combined bitmap 602 is a variable-length bitmap transmitted by a VLC device that includes an aggregation bitmap and a corresponding guard bitmap for each optical source type (e.g. each LED) of the VLC device. Based on the bandplan 400, the length of the combined bitmap 602 is equivalent to 'n' sets of octets, where 'n' is the number of optical source types (e.g. number of LEDs). Each set of octets includes an octet for an aggregation bitmap and a corresponding guard bitmap for an optical source type. Octet 605 is an example of an 8-bit bitmap that may be used to represent either an aggregation bitmap or a guard bitmap for one light source (e.g. one LED), such as light source 312 of transmitter 310. The number of bits in the bitmap is set to the number of bands in the bandplan (such as bandplan 400), and the bit position in the bitmap corresponds to the index value (i.e. a frequency band in the bandplan). As such, the first seven bits in octet 605 are allocated to the seven bands in the bandplan 400, and the eighth bit is either unallocated or reserved for some other purpose.

The combined bitmap 602, which has a first portion that groups all aggregated bitmaps and a second portion that groups all guard bitmaps is but one example of a combined bitmap and does not limit the scope of the disclosure. For example, in another embodiment, a combined bitmap may group each set of octets, such that the each alternating bitmap is an aggregated bitmap or a guard bitmap. The format of the combined bitmap will largely depend on the format of each aggregated and guard bitmap. FIGS. 6B and 6C illustrate aggregated and guard bitmaps that use the format of the octet 605. Furthermore, the example bitmaps in FIGS. 6B, 6C, 7A 7B, 8B, 8C, 9, and 10 incorporate the frequency allocation of bandplan 400. As such, the illustrated example bitmaps contain bit arrangements for seven bands. Embodiments in which the bitmaps contain unused bits may set the unused bits to zero ('0').

In FIG. 6B, aggregation Bitmap 610 and guard Bitmap 615 correspond to the transmission illustrated in FIG. 5A. Suppose Band i corresponds to an index value of '1', Band j corresponds to an index value of '2', and the bandplan contains seven frequency bands such as bandplan 400. The active frequency bands of the transmitter in this example are Bands i and j. The number of bits in the bitmap is set to the number of bands in the bandplan, and the aggregation bitmap 610 may be represented as '0110000'. That is, each bit position of the aggregation bitmap, from left to right, corresponds to an index value, which is associated with a frequency band in bandplan 400. The values at the bit positions that correspond to the active frequency bands are set to '1'. The aggregation bitmap is used to indicate the active frequency bands when the light source is intentionally transmitting across multiple bands. The guard bitmap 615 in this example would be '0000000', as there is no leakage transmission.

In FIG. 6C, aggregation bitmap 620 and guard bitmap 625 correspond to the two transmissions illustrated in FIG. 5B. Suppose Band i corresponds to an index value of '1', Bands p, q, and r correspond to index values of '3', '4', and '5', respectively, and bandplan 400 is used to construct aggregation bitmap 620 and guard bitmap 625. Band i contains intentional transmission 520, and Bands p, q, and r contain unintentional leakage transmission 530. Using the same bitmap format described with regard to FIG. 6B, aggregation bitmap 620 is set to '0100000' and guard bitmap 625 is set to '0001110'.

It should be noted that the frequency bandplan support of each light source can be indicated as part of an aggregation bitmap. For example, aggregation bitmap 625 can be used to indicate the active frequency bands even though there was no actual band aggregation. This eliminates the need to separately inform the channel support capabilities in a separate field in the MAC.

FIGS. 7A and 7B illustrate aggregation and guard bitmaps that use run-length type of encoding according to another embodiment of the present disclosure. A bitmap using run-length encoding contains two numerical representations—a starting bit position 702 and the number of bands 704. This optimization can help reduce the number of bits used, especially for large number of channels. This optimization makes use of the fact that only log 2(m) number of bits are needed to indicate the starting position (where m is the number of bands in the bandplan and the log 2( ) value is rounded up to the next integer), and a typical light source may not span more than two or three bands. This can be applied to both channel aggregation and guard channels. The tradeoff is that discontinuities in the either the intentional or unintentional transmission may not be represented efficiently.

FIG. 7A illustrates aggregation bitmap 710 and guard bitmap 715 which correspond to the transmission of FIG. 5A. Suppose again that Band i corresponds to an index value of '1', Band j corresponds to an index value of '2', and the bandplan contains seven frequency bands such as bandplan 400. The starting position 702 has a bit length of three as bandplan 400 contains seven bands, and log 2(7) rounded to the next integer is three. The number of bands 704 has a bit length of two as a typical light source may not span more than two or three bands. Therefore, aggregation bitmap 710 is '00110' ('001' starting position and '10' for the two bands) and guard bitmap 55 is '00000' as there is no leakage transmission.

In FIG. 7B, aggregation bitmap 720 and guard bitmap 725 correspond to the two transmissions illustrated in FIG. 5B. Suppose Band i corresponds to an index value of '1', Bands p, q, and r correspond to index values of '3', '4', and '5', respectively, and bandplan 400 is used to construct aggregation bitmap 720 and guard bitmap 725. Band i contains intentional transmission 520, and Bands p, q, and r contain unintentional leakage transmission 530. Using the same run-length type of encoding and bitmap format described with regard to FIG. 7A, aggregation bitmap 720 is set to '00101' ('001' starting position and '01' for the single active band) and guard bitmap 725 is set to '01111' ('011' starting position and '11' for three bands spanned by the unintentional transmission 530). It should be noted that FIGS. 7A and 7B illustrate one specific method of using run-length type encoding and is not meant to be the only format used.

Figure 8B:
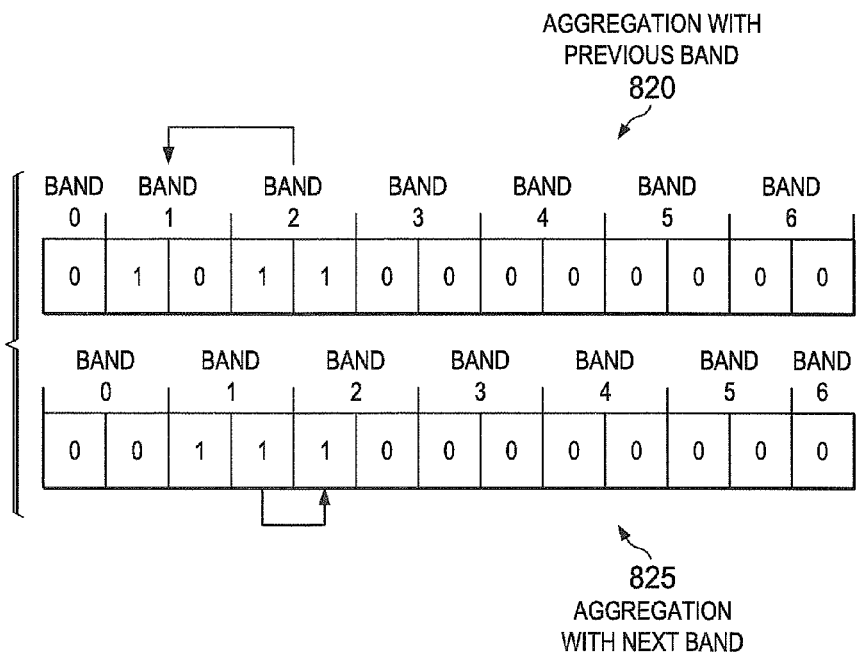
Figure 8C:
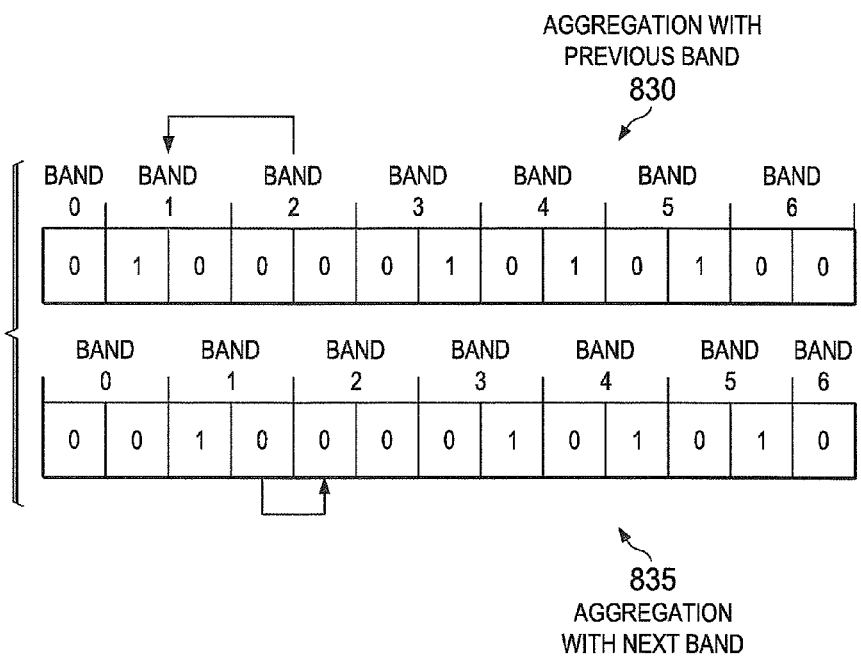

FIGS. 8A-8C illustrate merged aggregation and guard channel bitmaps according to an embodiment of the present disclosure. In this embodiment, the guard channel bitmap and the aggregation channel bitmap can be combined into a single bitmap. A bitmap having a bit length of 2*m−1 (where m is the number of bands in a bandplan) can be used for indicating the color band aggregation and the guard channel bitmap for the VLC device. Two bits are used to represent each band. Merged mapping 810 illustrates how each two-bit combination is mapped to a particular usage the channel. '00' indicates that the band is not used. '01' indicates a guard band. '10' indicates that the band is used as an active frequency band but is not aggregated. '11' indicates that the band is used as an active frequency band and is also aggregated. In some embodiments, '11' indicates that the band is aggregated with a previous band while in some other embodiments, '11' indicates that the band is aggregated with the next band.

FIG. 8B illustrates merged bitmaps 820 and 825 which correspond to the transmission of FIG. 5A using the two-bit combinations described in merged mapping 810 to represent each band. Suppose that Band i corresponds to an index value of '1', Band j corresponds to an index value of '2', and the bandplan contains seven frequency bands such as bandplan 400. Merged bitmaps 820 and 825 each indicate both aggregation and guard channels and have a bit length of 13. In merged bitmap 820, bit combination '11' indicates backward aggregation (i.e. the band is aggregated with the previous band). In merged bitmap 825, bit combination '11' indicates forward aggregation (i.e. the band is aggregated with the next band).

FIG. 8C illustrates merged bitmaps 830 and 825 which correspond to the transmission of FIG. 5B using the two-bit combinations described in merged mapping 810 to represent each band. Suppose Band i corresponds to an index value of '1', Bands p, q, and r correspond to index values of '3', '4', and '5', respectively, and bandplan 400 is used to construct merged bitmaps 830 and 835. Merged bitmap 830 indicates backward aggregation while merged bitmap 835 indicates forward aggregation. In both merged bitmaps 830 and 835, Band '1' is represented by '10' (band used as an active frequency band that is not aggregated), while Bands '3', '4', and '5' are each represented by '01' (band used as a guard band).

In some embodiments, each band may be represented by two bits regardless of whether the bit combination indicates forward or backward aggregation, the merged bitmap would have a bit length of 2m, where m is equivalent to the number of bands in the bandplan.

Figure 9:
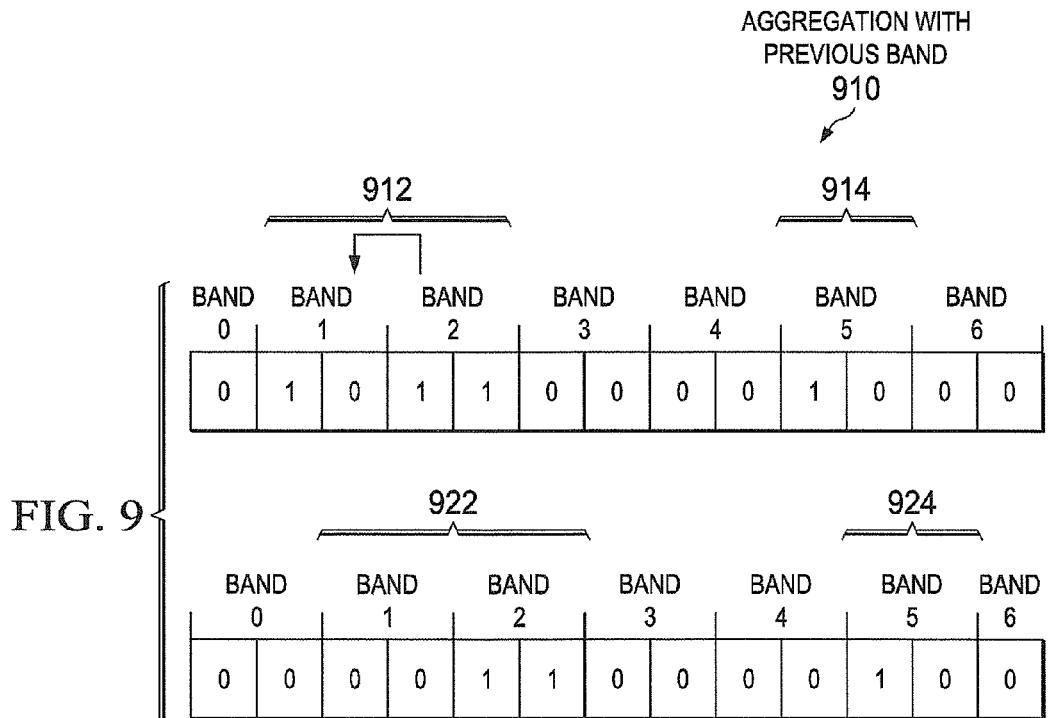
FIG. 9 illustrates a merged bitmap that represents multiple light sources according to an embodiment of the present disclosure.

FIG. 9 illustrates a merged bitmap that represents multiple light sources according to an embodiment of the present disclosure. Using the two-bit combinations as described in merged mapping 810, it is possible to represent multiple light sources in a single bitmap. Assuming there is no overlap in guard and transmission frequency bands between the different light sources, there is no need to create a separate bitmap for each light source. This is because the "band used but not aggregated" bit combination ('10') serves as a natural demarcation for multiple light sources. For example, '10' for Band 1 followed by '10' for Band 2 implies two separate light sources, while '10' for Band 1 followed by '11' for Band 2 (or '11' followed by '10' if forward aggregation) implies band aggregation, i.e. a light source whose transmission spans two adjacent bands.

Merged bitmaps 910 and 920 both illustrate a merged bitmap that represents represent two active light sources. The first light source has a frequency spectrum that spans across Bands 1 and 2. The second light source has a frequency spectrum that is within Band 5. Merged bitmap 910, which uses backward aggregation, represents the aggregated band 912 of the first light source 912 with '10' at Band 1 followed by '11' at Band 2 and represents the single band 914 of the second light source with '10' at Band 5. Merged bitmap 920, which uses forward aggregation, represents the aggregated bad 922 of the first light source with '11' at Band 1 followed by '10' at Band 2 and represents the single band 924 of the second light source with '10' at Band 5.

Figure 10:
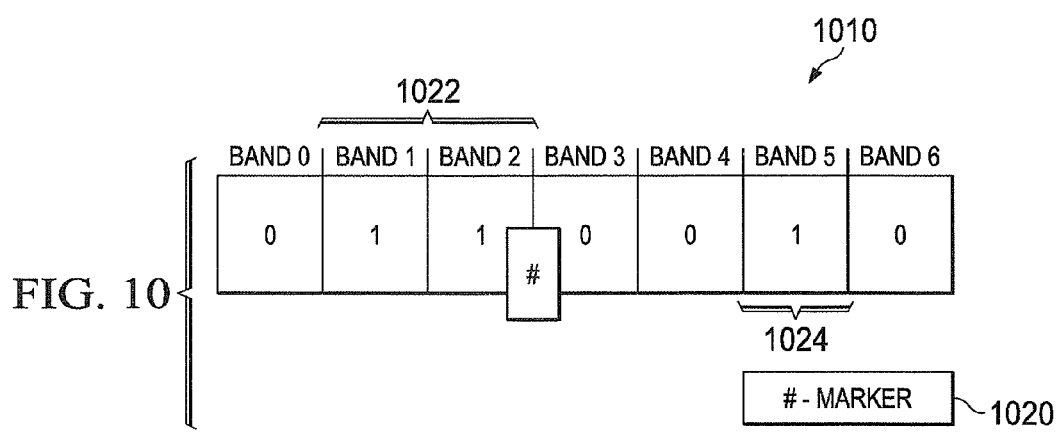
FIG. 10 illustrates the use of a marker to demarcate aggregated channels in a bitmap that represents multiple light sources according to an embodiment of the present disclosure.

FIG. 10 illustrates the use of a marker 1020 to demarcate aggregated bands in a bitmap 1010 that represents multiple light sources from a VLC device according to an embodiment of the present disclosure. In this particular example, bitmap 1010 represents two light sources. The first light source is represented in bitmap 1010 by aggregated band 1022, and the second light source is represented by a single band 1024. For the color bands of a VLC device, markers can be inserted in between two aggregated bands to separate the aggregate bands. For example, the marker can be used to indicate either the end of an aggregated band or the beginning of a new aggregated band. In bitmap 1010, marker 1020 indicates the end of an aggregated band 1022 of the first light source 1022, which transmits over Band 1 and Band 2.

The marker 1020 may be represented in log 2(m) number of bits to indicate the position of separation (where m is the number of bands in the bandplan and the log 2( ) calculation is rounded up to the next integer). The marker 1020 may be implemented as a separate description of the boundary and not included in the bitmap. The marker 1020 may also be multiple bits that are used to distinguish transitions for both guard and aggregate channels.

Figure 11:
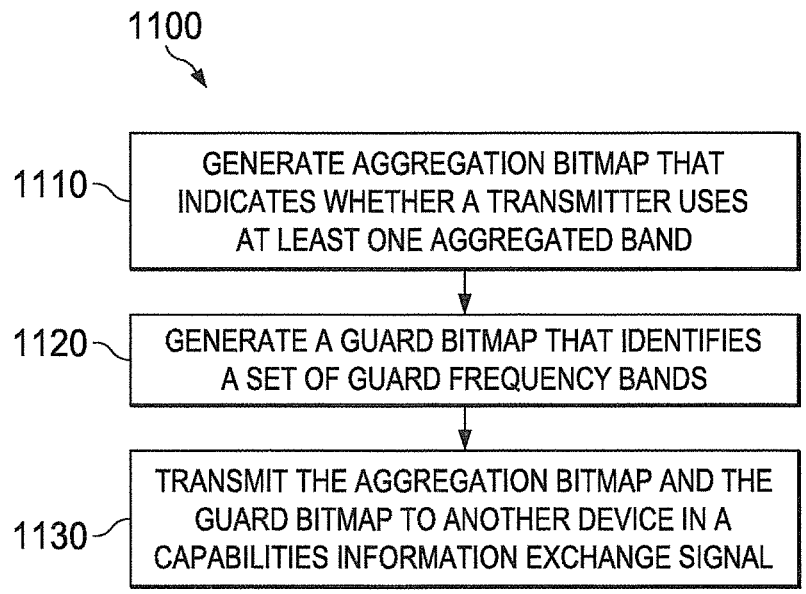
FIG. 11 illustrates a process for receiving capabilities information from a transmitting VLC device during link establishment and association according to embodiments of the present disclosure.

FIG. 11 illustrates a process 1100 for transmitting capabilities information to a receiving VLC device during link establishment and association according to embodiments of the present disclosure. The embodiment of the process 1100 shown in FIG. 11 is for illustration only. Other embodiments could be used without departing from the scope of this disclosure.

To place processes 1100 and 1200 into context, a transmitting VLC device generates one or more bitmaps that describe the MAC capabilities of its transmitter. The transmitting VLC device transmits the bitmaps during link establishment. The one or more bitmaps may include, but is not limited to active frequency bands of each light source, aggregation of active frequency bands, and guard channels. The bitmaps may be in any of the formats described with respect to FIGS. 6B-6C, 7A-7B, 8A-8C, 9, and 10, or in any other format that supports a bandplan such as bandplan 400.

At block 1110, a controller, such as transmitter 305 of VLC device 300, generates an aggregation bitmap that indicates whether a VLC transmitter of a first device uses at least one aggregated band that includes multiple active frequency bands. That is, the controller applies a bandplan (such as bandplan 400) to map each active frequency band in an aggregated band to the corresponding index value or code in the bitmaps. The active frequency bands indicate the VLC frequency bands over which the light source(s) of the transmitting VLC device is capable of transmitting data.

In block 1120, controller generates a guard bitmap that identifies a set of guard frequency bands. Each guard frequency band indicates a leakage transmission caused by a light source of the transmitting VLC device. In other words, the guard bitmap identify guard channels that on which the respective optical source unintentionally leak into other bands. Identifying guard channels allows erroneous information to be discarded and improves performance at the receiver. As mentioned earlier, the leakage transmission may be due to a material used in manufacturing the light source. A receiver may set a number of guard channels to filter out the leakage transmission. The receiving VLC device may also include filters that can be used to filter out unintentional transmission at certain frequency bands. In this embodiment, the controller of a receiving VLC device may determine whether a corresponding filter is available for each guard frequency band indicated in the bitmap and activate the corresponding filter. In some embodiments, these operations may be performed by receiver 315.

In block 1130, the aggregation and guard bitmaps are transmitted in a capabilities information exchange signal. In an embodiment, the aggregation and guard bitmaps may be generated and transmitted separately. Alternatively, the aggregation and guard bitmaps may be transmitted together, as shown in block 1130.

Figure 12:
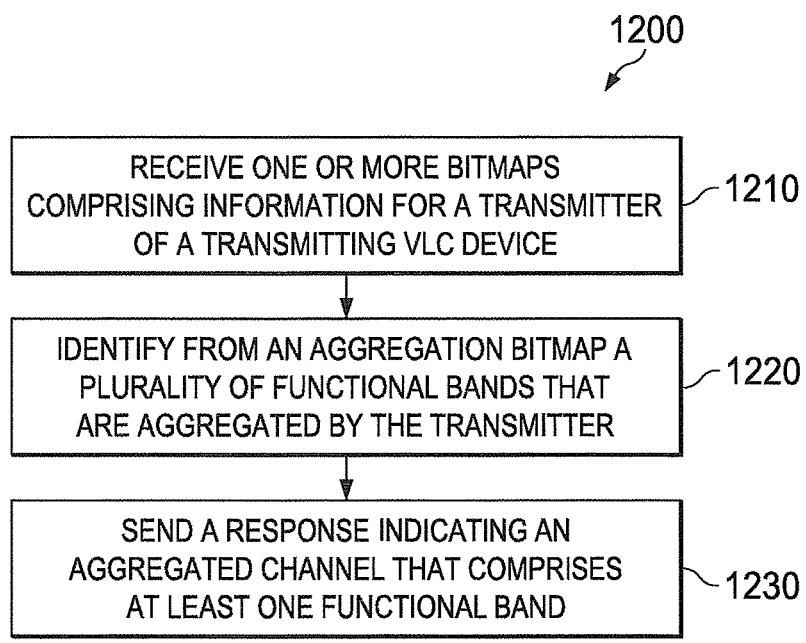
FIG. 12 illustrates a process for exchanging capabilities information between two VLC devices during link establishment and association according to embodiments of the present disclosure.

In some embodiments, two VLC devices may communicate bi-directionally during link establishment and association. FIG. 12 illustrates a process 1200 for exchanging capabilities information between two VLC devices during link establishment and association according to some embodiments of the present disclosure. The embodiment of process 1200 shown in FIG. 12 is for illustration only. Other embodiments could be used without departing from the scope of this disclosure.

In block 1210, a receiver of a first VLC device receives from a transmitter of a second VLC device one or more bitmaps during a capabilities field exchange in the MAC layer during link establishment and association. In block 1220, a controller of the first VLC device identifies an aggregation bitmap from the one or more bitmaps and determines a plurality of functional frequency bands that are aggregated by the transmitter. That is, index values or codes in the bitmaps are mapped to corresponding frequency bands in a bandplan (such as bandplan 400) to determine the functional frequencies that make up the aggregated band. The functional frequency bands are the VLC frequency bands over which the light source(s) of the second VLC device is capable of transmitting data.

At this point, the first VLC device may select a subset of plurality of functional frequency bands based on availability or performance. For example, some bands may be reserved for communication with another device or unavailable for any number of reasons. At block 1230, first VLC device sends a response back to the second VLC device indicating an aggregated channel that comprises at least one of the functional frequency bands.

Similarly, the receiver of the first VLC device determines whether the one or more bitmaps also indicate a set of guard frequency bands for leakage transmission from the transmitter of the second VLC device. Each guard frequency band also maps to a bandplan. The receiver sets a guard channel to filter out the leakage transmission. The receiver may set the guard channel by ignoring signals received over frequency band that corresponds to the guard channel. Alternatively, the receiver may have a number of filters to filter out specific frequency bands.

Upon receiving the response signal, the second VLC device may begin transmitting data over the functional frequency bands indicated in the response from the first VLC device. The response transmitted by the first VLC device may use the same bitmap format received from the second VLC device. In some embodiments, the VLC devices may be able to exchange MAC capabilities using multiple bitmap formats.

Although MAC capabilities exchange process has been described with only one transmitting VLC device and one receiving VLC device, both VLC devices may transmit and receive bitmaps during link establishment and association for bi-directional communication.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
generating an aggregation bitmap that indicates whether a visible light communication (VLC) transmitter of a first device uses at least one aggregated band that comprises multiple frequency bands among a plurality of predefined frequency bands of a bandplan, the predefined frequency bands of the bandplan collectively representing a visible light spectrum, each bit of the aggregation bitmap representing either aggregation or non-aggregation for a respective frequency band of the bandplan; and
transmitting the aggregation bitmap in a capabilities information exchange (CIE) signal via the transmitter of the first device to a second device.

2. The method of claim 1, further comprising:
generating a guard bitmap that identifies a set of guard frequency bands, wherein each guard frequency band indicates leakage transmission from the VLC transmitter; and
transmitting the guard bitmap in the CIE signal to the second device.

3. The method of claim 2, wherein the CIE signal comprising the aggregation and guard bitmaps is transmitted by a media access control (MAC) layer during link establishment and association with the second device.

4. The method of claim 3, wherein the aggregation and guard channel bitmaps each represent a plurality of the predefined bands of the bandplan, and wherein each predefined band is associated with a logical channel in the MAC layer.

5. The method of claim 2, wherein the CIE signal includes at least one of an aggregation bitmap and a guard bitmap for each optical source type in the first device.

6. The method of claim 4, wherein a number of bits in each of the aggregation and guard bitmaps is equivalent to a number of frequency bands within the plurality of predefined frequency bands, and wherein each bit of the aggregation and guard bitmaps represents one of the predefined frequency bands.

7. The method of claim 5, wherein a number of aggregation and guard channel bit-maps is dependent on a number of optical source types.

8. A visible light communication (VLC) device, comprising:
a visible light communication (VLC) transmitter configured to utilize multiple frequency bands and to transmit VLC signals; and a controller configured to generate an aggregation bitmap that indicates whether the VLC transmitter uses at least one aggregated band that comprises multiple frequency bands among a plurality of predefined frequency bands of a bandplan, the predefined frequency bands of the bandplan collectively representing a visible light spectrum, each bit of the aggregation bitmap representing either aggregation or non-aggregation for a respective frequency band of the bandplan, and to include the aggregation bitmap in a capabilities information exchange (CIE) signal to be transmitted to a second device.

9. The VLC device of claim 8, wherein the controller is further configured to generate a guard bitmap that identifies a set of guard frequency bands, wherein each guard frequency band indicates leakage transmission from the VLC transmitter, and to include the guard bitmap in the CIE signal to be transmitted to the second device.

10. The VLC device of claim 9, wherein the controller is configured to cause the cm signal comprising the aggregation and guard bitmaps to be transmitted by a media access control (MAC) layer during link establishment and association with the second device.

11. The VLC device of claim 10, wherein the aggregation and guard channel bitmaps each represent a plurality of the predefined bands of the bandplan, and wherein each predefined band is associated with a logical channel in the MAC layer.

12. The VLC device of claim 9, wherein the controller is further configured to include in the CIE signal at least one of an aggregation bitmap and a guard bitmap for each optical source type in the VLC device.

13. The VLC device of claim 11, wherein a number of bits in each of the aggregation and guard bitmaps is equivalent to a number of frequency bands within the plurality of predefined frequency bands, wherein each bit of the aggregation and guard bitmaps represents one of the predefined frequency bands.

14. The VLC device of claim 12, wherein a number of aggregation and guard channel bit-maps is dependent on the number of optical source types.

15. A non-transitory storage medium comprising software instructions for use in a device that supports visible light communication (VLC) utilizing multiple frequency bands, the software instructions when executed by a controller configured to:

generate an aggregation bitmap that indicates whether a visible light communication (VLC) transmitter of a first device uses at least one aggregated band that comprises multiple frequency bands among a plurality of predefined frequency bands of a bandplan, the predefined frequency bands of the bandplan collectively representing a visible light spectrum, each bit of the aggregation bitmap representing either aggregation or non-aggregation for a respective frequency band of the bandplan; and transmit the aggregation bitmap in a capabilities information exchange (CIE) signal via a transmitter of a first device to a second device.

16. The non-transitory storage medium of claim 15, further comprising software instructions configured to:

generate a guard bitmap that identifies a set of guard frequency bands, wherein each guard frequency band indicates leakage transmission from the VLC transmitter; and transmit the guard bitmap in the CIE signal to the second device.

17. The non-transitory storage medium of claim 16, wherein the CIE signal comprising the aggregation and guard bitmaps is transmitted by a media access control (MAC) layer during link establishment and association with the second device.

18. The non-transitory storage medium of claim 17, wherein the aggregation and guard channel bitmaps each represent a plurality of the predefined bands of the bandplan, and wherein each predefined band is associated with a logical channel in the MAC layer.

19. The non-transitory storage medium of claim 16, wherein the CIE signal includes at least one of an aggregation bitmap and a guard bitmap for each optical source type in the first device, and wherein a number of aggregation and guard channel bit-maps is dependent on a number of optical source types.

20. The non-transitory storage medium of claim 18, wherein a number of bits in each of the aggregation and guard bitmaps is equivalent to a number of frequency bands within the plurality of predefined frequency bands, and wherein each bit of the aggregation and guard bitmaps represents one of the predefined frequency bands.

* * * * *